United States Patent [19]

Reuschenbach et al.

[11] Patent Number: 5,635,634
[45] Date of Patent: Jun. 3, 1997

[54] METHOD FOR CALCULATING THE AIR CHARGE FOR AN INTERNAL COMBUSTION ENGINE WITH VARIABLE VALVE TIMING

[75] Inventors: Lutz Reuschenbach, Stuttgart; Hans Veil, Eberdingen, both of Germany

[73] Assignee: Robert Bosch GmbH, Stuttgart, Germany

[21] Appl. No.: 406,992

[22] PCT Filed: Jul. 29, 1994

[86] PCT No.: PCT/DE94/00886

§ 371 Date: Mar. 29, 1995

§ 102(e) Date: Mar. 29, 1995

[87] PCT Pub. No.: WO95/04215

PCT Pub. Date: Feb. 9, 1995

[30] Foreign Application Priority Data

Aug. 2, 1993 [DE] Germany .............. 43 25 902.2

[51] Int. Cl.$^6$ .................................................. G01M 15/00
[52] U.S. Cl. ........................ 73/118.2; 123/90.15
[58] Field of Search .................... 73/118.2, 23.31, 73/23.32, 112, 115, 116, 117.3; 123/90.15, 90.16

[56] References Cited

U.S. PATENT DOCUMENTS

| | | | |
|---|---|---|---|
| 4,357,917 | 11/1982 | Aoyama | 123/90.12 |
| 4,856,465 | 8/1989 | Denz et al. | |
| 4,986,243 | 1/1991 | Weissler, II et al. | |
| 5,020,487 | 6/1991 | Kruger | 123/90.15 |
| 5,050,428 | 9/1991 | Shimomura et al. | 73/118.2 |
| 5,090,366 | 2/1992 | Gondek | 123/90.17 |
| 5,167,147 | 12/1992 | Peters et al. | 73/118.2 |
| 5,199,403 | 4/1993 | Akazaki et al. | 123/90.15 |
| 5,207,094 | 5/1993 | Gmelin et al. | 73/118.2 |
| 5,211,056 | 5/1993 | Takamoto et al. | 73/118.2 |
| 5,228,336 | 7/1993 | Nagaishi | 73/118.2 |
| 5,228,422 | 7/1993 | Wakeman | 123/432 |
| 5,230,310 | 7/1993 | Hashimoto | 123/188.8 |
| 5,230,320 | 7/1993 | Hitomi et al. | 123/90.15 |
| 5,293,553 | 3/1994 | Dudek et al. | 73/118.2 |
| 5,293,741 | 3/1994 | Kashiyama et al. | 123/90.15 |
| 5,329,894 | 7/1994 | Phoenix et al. | 123/90.15 |
| 5,357,932 | 10/1994 | Clinton et al. | |
| 5,383,356 | 1/1995 | Zurek et al. | 73/118.2 |
| 5,421,308 | 6/1995 | Hitomi et al. | 123/90.15 |
| 5,441,021 | 8/1995 | Moore, II | 123/90.17 |
| 5,443,050 | 8/1995 | Hitomi et al. | 123/90.15 |
| 5,450,824 | 9/1995 | Yamane et al. | 123/90.15 |
| 5,469,818 | 11/1995 | Yoshioka et al. | 123/90.15 |
| 5,482,012 | 1/1996 | Yoshioka | 123/90.15 |
| 5,494,008 | 2/1996 | Ohkawa et al. | 123/90.15 |
| 5,497,737 | 3/1996 | Nakamura | 123/90.15 |
| 5,529,031 | 6/1996 | Yoshioka | 123/90.15 |
| 5,529,034 | 6/1996 | Sone et al. | 123/90.15 |
| 5,531,193 | 7/1996 | Nakamura | 123/90.15 |

FOREIGN PATENT DOCUMENTS

4018775 12/1991 Germany.
63-297746 12/1988 Japan.

*Primary Examiner*—Richard Chilcot
*Assistant Examiner*—Eric S. McCall
*Attorney, Agent, or Firm*—Walter Ottesen

[57] ABSTRACT

The invention relates to a method for dynamically correctly computing the air charge of a cylinder for an internal combustion engine having a variable charge-cycle control such as with an adjustable inlet and/or outlet camshaft especially in the transient operation. For this purpose, the influence of the variation of the charge-cycle control is considered for the computation of the fresh-air portion of the total charge of the cylinder.

8 Claims, 8 Drawing Sheets

METHOD FOR CALCULATING THE AIR CHARGE FOR AN INTERNAL COMBUSTION ENGINE WITH VARIABLE VALVE TIMING

FIELD OF THE INVENTION

The invention relates to a method for dynamically correctly computing the air charge of a cylinder for an internal combustion engine equipped with variable charge-cycle control such as with a displaceable inlet camshaft and/or outlet camshaft especially during transient operation.

BACKGROUND OF THE INVENTION

U.S. Pat. No. 4,856,465 discloses an internal combustion engine having control times which are varied via a rotational shift of a camshaft relative to a camshaft drive in dependence upon operating parameters. The rpm N of the internal combustion engine as well as the load signal T1 K*Q/N are exemplary of operating parameters. The load signal is determined in the computer for the injection and corresponds to the air throughput standardized to a stroke of the engine.

Conventional load determining methods measure the air mass flowing into the intake pipe (for example, with a hot-wire air-flow sensor) or utilize the throttle flap open angle in combination with the rpm or the intake pressure Ps as a measure for the load.

In the case where an air mass is measured, the air mass actually flowing into the cylinder can be determined with the aid of an air-mass balance for the intake pipe. The following applies for the change dMs of the air mass Ms in the intake pipe during the intake stroke of a cylinder:

$$dMs = Mdk - Mz \qquad (1)$$

wherein: Mdk is the air mass flowing in through the throttle flap during the intake stroke; and, Mz is the air mass inducted by the cylinder.

mMz can be approximately described by the relationship of intake pipe volume Vs and effective displacement (swept volume) Vh/Z*eta as delineated below by assuming that a portion (eta) of the displacement is charged with a fresh charge of air/fuel mixture.

$$Mz = \frac{Ms * Vh * eta}{Z * Vs} \qquad (2)$$

wherein: Z is the number of cylinders and Vh is the displacement of the engine. The variable (eta) is also characterized as the volumetric efficiency. If (eta) does not change significantly, the following results for the change of the air charge of the cylinder dMz:

$$dMz = dMs * \frac{Vh * eta}{Z * Vs} \qquad (3)$$

The air mass Mdk flowing in through the throttle flap can be expressed as follows with the aid of the measured air flow Qm and the time duration dT of the intake stroke:

$$Mdk = Qm * dT \qquad (4)$$

The time duration dT follows from the engine rpm N and the number of cylinders Z:

$$dT = \frac{2}{N * Z} \qquad (5)$$

The change dMz of the air charge of the cylinder therefore follows:

$$dMz = \frac{Vh * eta}{Z * Vs} * Qm * \left( \frac{2}{N * Z} - Mz \right) \qquad (6)$$

From equation (6), a recurrence equation can be derived for determining the air charge of the cylinder:

$$dMz = Mz(k) - Mz(k-1) \qquad (7)$$

and therefore:

$$Mz(k) = Mz(k-1) + \frac{Vh * eta}{Z * Vs} * \left( Qm * \frac{2}{N * Z} - Mz(k-1) \right) \qquad (8)$$

For internal combustion engines having a variable charge-cycle control, this computation rule, however, does not lead to optimal results under some circumstances. If, for example, the valve overlap (that is, the time span during which the inlet and outlet valves are opened simultaneously) is changed, then the exhaust-gas mass also changes which flows back from the exhaust manifold into the intake pipe during valve overlap. This exhaust gas displaces a portion of the fresh charge of air/fuel mixture in the cylinder and thereby causes a great change of the volumetric efficiency (eta). The preconditions for the derivation of equation (8) are therefore no longer present. The method up to now can therefore not correctly determine the air charge of the cylinder during transient operation which leads to intense fluctuations in the fuel/air ratio, especially during transient operation.

In the case of a measurement of the air pressure Ps in the intake pipe, the air charge of the cylinder can be computed by means of a simple straight-line equation as follows:

$$Mz = K * (Ps - Ps0) \qquad (9)$$

The load signal determination from throttle flap angle and the rpm is known and is a further example of load determination.

For engines having variable charge-cycle control, it has however been shown that the factor K and the offset Ps0 in equation (9) are greatly dependent upon the position of the camshaft and on the rpm. This method too does not provide an adequately precise result for displaceable camshafts.

SUMMARY OF THE INVENTION

The object of the invention is to provide a method which considers the influence of a variation of the charge-cycle control on the determination of load.

The invention solves this task by including the influence of the charge-cycle control on the computation of the fresh-air portion of the total charge (inducted air/fuel mixture and residual combusted gas) of the work volume of a cylinder of an internal combustion engine.

For this purpose, at least one variable which characterizes the control intervention is considered for an internal combustion engine wherein the exchange of the total charge of the work volume can be influenced by a control intervention in dependence upon operating parameters and wherein a variable is detected which defines a measure for the quantity of fresh air. This quantity of fresh air flows in via the intake pipe for determining the fresh-air portion of the total charge of the work volume in addition to the measure for the quantity of fresh air which flows into the engine via the intake pipe.

The valve overlap is a variable which characterizes the control intervention to be considered. The valve overlap is the angular range wherein the inlet valve and the outlet valve of a single work volume (cylinder) are simultaneously open.

In addition, the position of the angular range relative to a reference angle of the camshaft (for example, the angle which corresponds to the dead center of the piston of the engine) can be considered as the variable characterizing the control intervention.

Variable valve-lift cams are realized for a controlled change of the cam contour for the actuation of a valve or also for individual electronically controlled and hydraulically actuated valves. In the case of such variable-lift cams, the course and/or the change of at least one valve-lift cam can be considered as a characterizing variable for the control intervention.

In the most general case, the influence of the control intervention is determined by integrating the smaller opening of the cylinder work volume (which is effective during the valve overlap) toward the inlet or outlet region of the engine over the duration of the valve overlap.

In the case of displaceable camshafts, the control intervention can be formed from the positions of the inlet or outlet camshafts. These positions can be detected by suitable sensors or can be computed as estimated values with the aid of a model for the camshaft positions. Based on the knowledge of the actual values for the control times, the parameters in the computation rule of equation (9) can be correspondingly varied for determining the air charge from the intake-pipe pressure.

An estimated value for the intake pipe pressure is first determined for a system having an air-mass sensor. With the aid of the relationship between intake-pipe pressure, actual value of the control times and rpm, the air charge of the cylinder can be computed. This relationship is known from an intake-pipe pressure system. In this way, the influence of the variation of the charge-cycle control can be described. Furthermore, the computation of the intake-pipe pressure as an intermediate value offers a simple possibility to balance the system by comparing to the measured intake pipe pressure. This is advantageous for the application of the fuel-metering system to a special type of internal combustion engine.

DESCRIPTION OF THE PREFERRED EMBODIMENTS OF THE INVENTION

Figure 1:
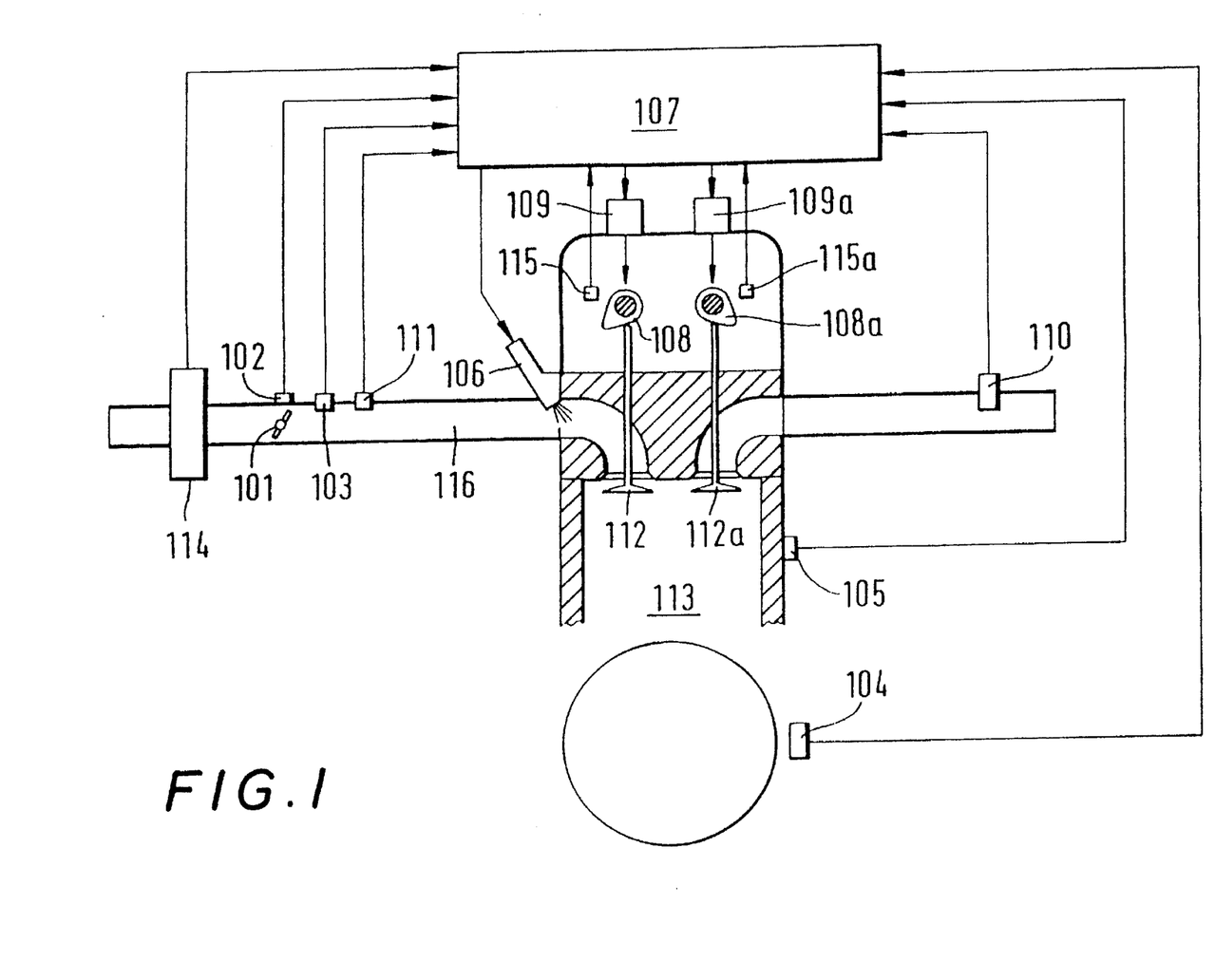
FIG. 1 shows an overview of an internal combustion engine having displaceable camshafts as well as a control apparatus for computing the injection time in accordance with the present invention.

FIG. 1 shows an internal combustion engine and a control apparatus for computing the injection time. The air mass flowing into the intake pipe 116 is detected by the air-mass sensor 114 (hot-wire or hot-film sensor) and is supplied to the control apparatus 107. The position of the throttle flap 101 is measured by a sensor 102. Furthermore, a sensor 111 is disposed in the intake pipe for the air temperature as well as a pressure sensor 103, if needed. The pressure sensor 103 can replace the air-mass sensor 114 in systems having intake-pipe pressure measurement.

The fuel quantity to be injected is computed by control apparatus 107 and is metered to the engine via the injection valve 106.

The air/fuel mixture reaches the cylinder 113 via the inlet valve 112. The exhaust gas is thrust into the exhaust-gas system via the outlet valve 112a. The residual oxygen content of the exhaust gas is detected by the oxygen sensor 110 and defines a measure for the air/fuel ratio.

The opening and closing time points of the inlet and outlet valves are determined via the corresponding inlet camshaft 108 as well as the outlet camshaft 108a. The positions of the camshaft and therefore the positions of the opening and closing time points of the inlet and outlet valves can be influenced relative to the top-dead-center point of the piston with the aid of adjusting devices 109 and 109a. The positions of the inlet and outlet camshafts are measured by the sensors 115 and 115a, respectively. In addition, the system includes a sensor 104 for detecting the rpm as well as the camshaft position and a temperature sensor 105 for detecting the temperature of the cooling water.

Figure 2:
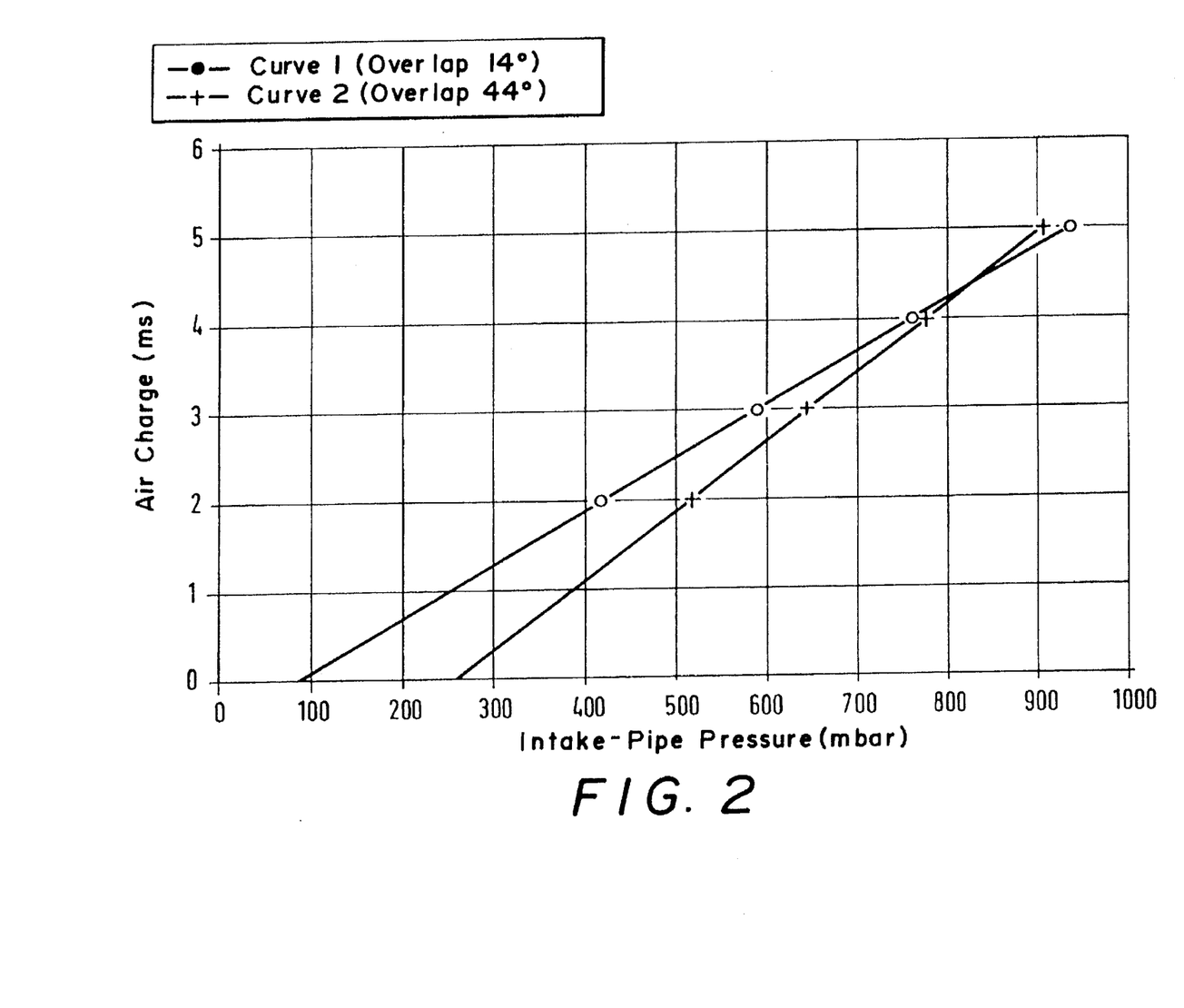
FIG. 2 makes clear the relationship between intake pipe pressure, camshaft position and air charge of the cylinder with respect to a measurement result.

FIG. 2 defines the relationship between the air charge of the cylinder and the intake-pipe pressure with respect to a measurement result. The air charge is given by the corresponding injection duration which is necessary in order to adjust a stoichiometric air/fuel ratio. The relationship between air charge and intake-pipe pressure was measured at an engine rotational speed of 1,800 rpm for two different camshaft positions. Curve 1 corresponds to a valve overlap of 14° crankshaft angle. Curve 2 was measured at a significantly greater valve overlap (44° crankshaft angle), that is, inlet and outlet valves are open at the same time for a significantly longer time span than for curve 1. For this reason, a significantly greater amount of exhaust gas can flow back into the intake pipe during the overlap phase for the second measurement and can displace a corresponding quantity of a fresh fuel/air mixture. Correspondingly, the air charge for the measurement 2 is less than for measurement 1 for the same intake-pipe pressure.

In both cases, however, the air charge can be determined from the intake-pipe pressure with the aid of a straight-line equation (9):

$$Mz = K \cdot (Ps - Ps0) \qquad (9)$$

wherein: the amplification factor K and the offset Ps0 are dependent upon the camshaft position and the rpm.

Figure 3A:
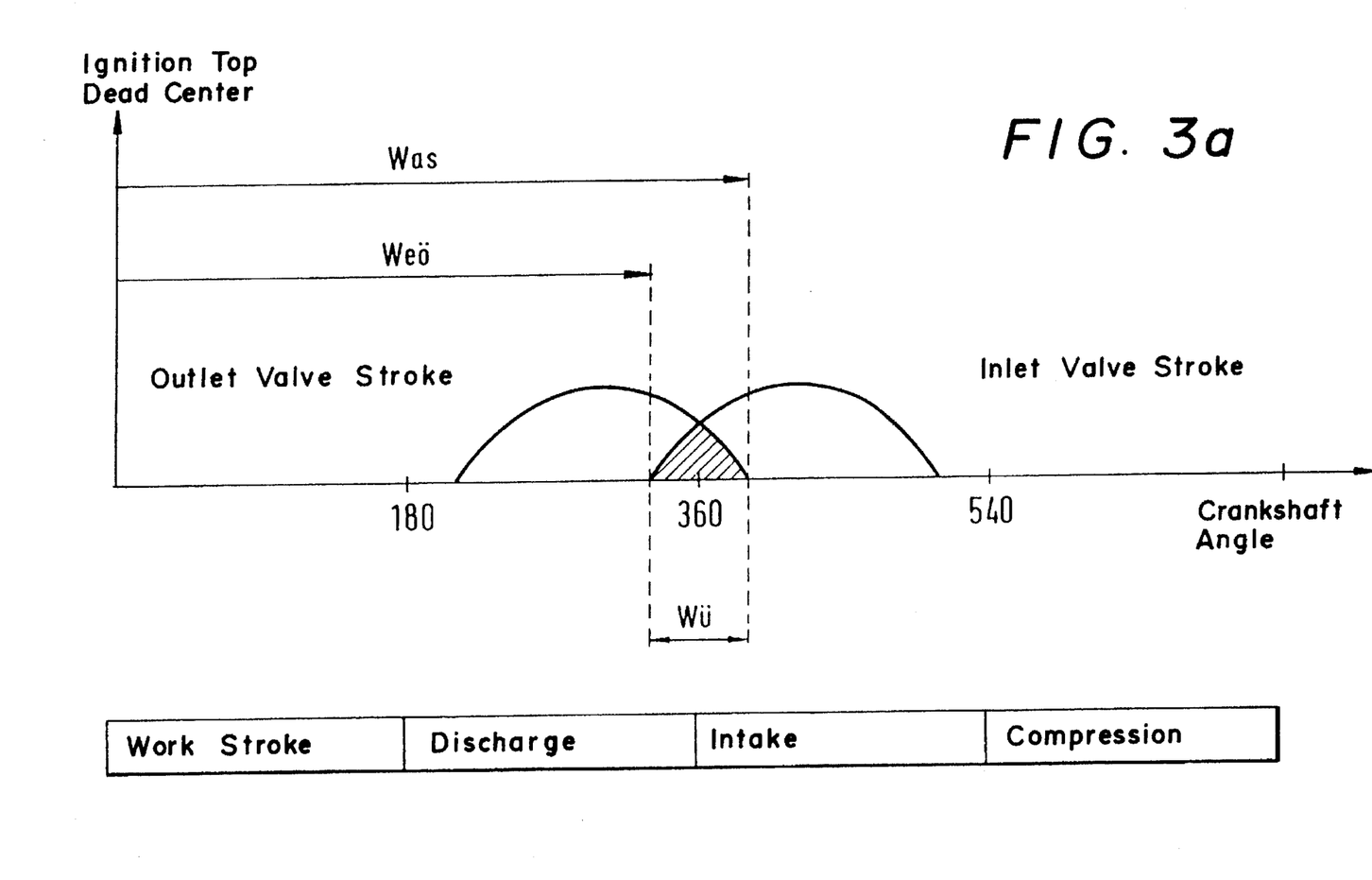
FIG. 3a shows the valve-lifting curves for the inlet and outlet valves and shows the measured camshaft positions and the valve overlap.
Figure 3B:
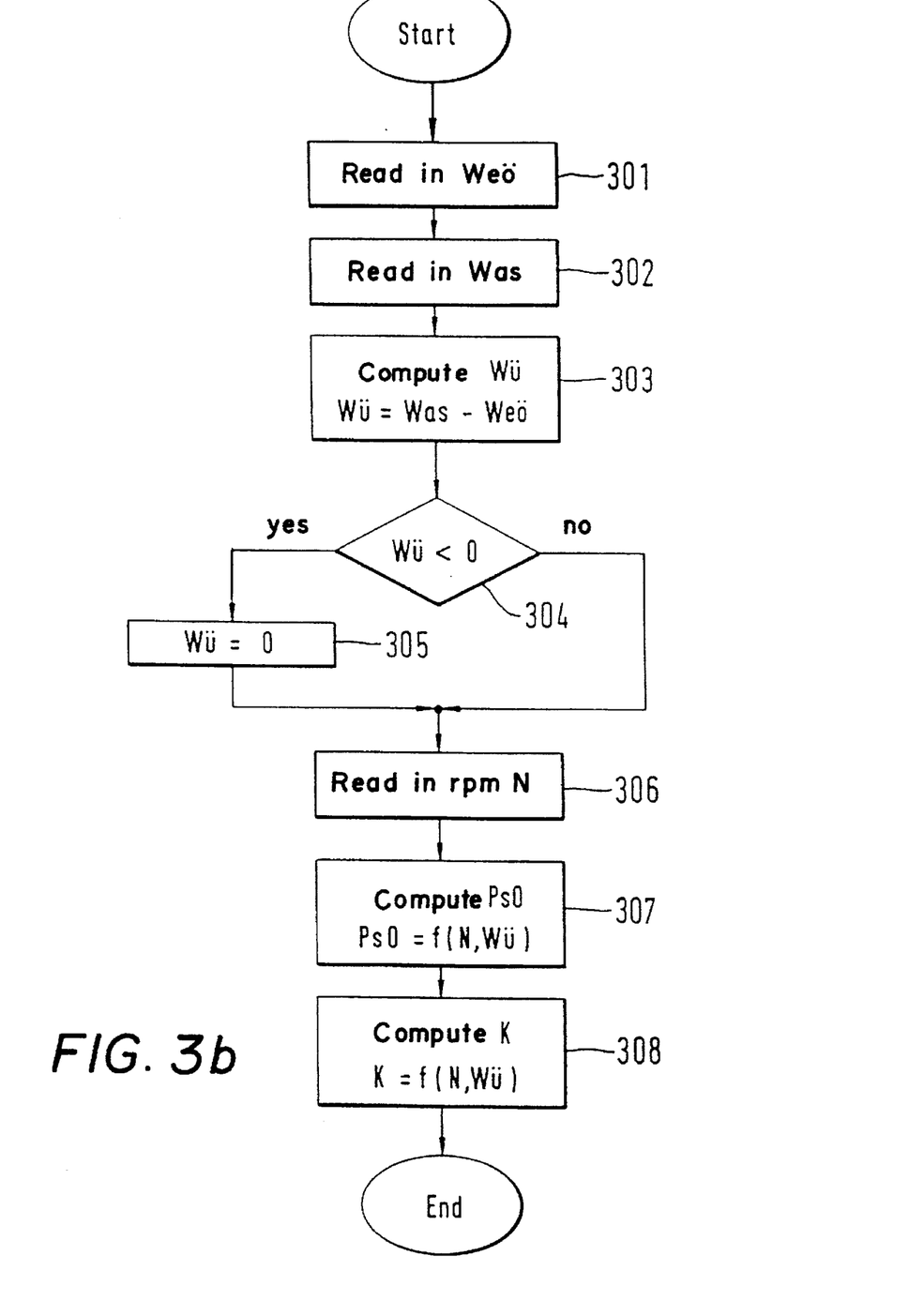
FIG. 3b is a flowchart for determining the valve overlap as well as the parameters for a system wherein intake-pipe pressure is measured. The parameters are necessary for computing the air charge.

FIGS. 3a and 3b describe a possible method for determining the camshaft position. FIG. 3a shows the valve-lift cams for the inlet and outlet valves. The sensor 115 detects the open angle Weo for the inlet valve measured starting with ignition top dead center. The sensor 115a supplies the closing time point Was of the outlet valve, also measured starting with ignition top dead center.

As already described, especially the valve overlap is important for the residual gas proportion and therefore for the influence on the air charge, that is, the length Wu of the range in which the inlet valve as well as the outlet valve are open. For this reason, it is sufficient to only apply the valve overlap Wu for computing the air charge in lieu of the two camshaft positions Weo and Was.

The flowchart in FIG. 3b describes a program for determining the valve overlap as well as the parameters which are necessary for computing the air charge. The program is started in an adequately fast time raster (for example, every 100 ms).

In steps 301 and 302, the signals of the sensors 115 and 115a are evaluated and the camshaft positions Weo and Was are stored in the RAM of the control apparatus.

In step 303, the valve overlap is computed as the difference of Was and Weo. In case the camshaft positions produce no valve overlap (that is, when inlet and outlet valves are not open at the same time), a negative value for Wu results in inquiry 304. In this case, the valve overlap is set to 0 in step 305.

Thereafter, the engine rpm N, which is measured by the rpm sensor 104, is read in (step 306). For computing the air charge in accordance with equation (9), an offset Ps0 and a proportionality factor K dependent upon rpm and valve overlap are needed. These are computed in steps 307 and 308 and made available for later load computation in the RAM of the control apparatus. The values of Ps0 and K are stored in tables in the ROM of the control apparatus for different valve overlaps and rpms. The determination of the actual values of Ps0 and K is performed by interpolation of the quantities taken from these tables.

Figure 4A:
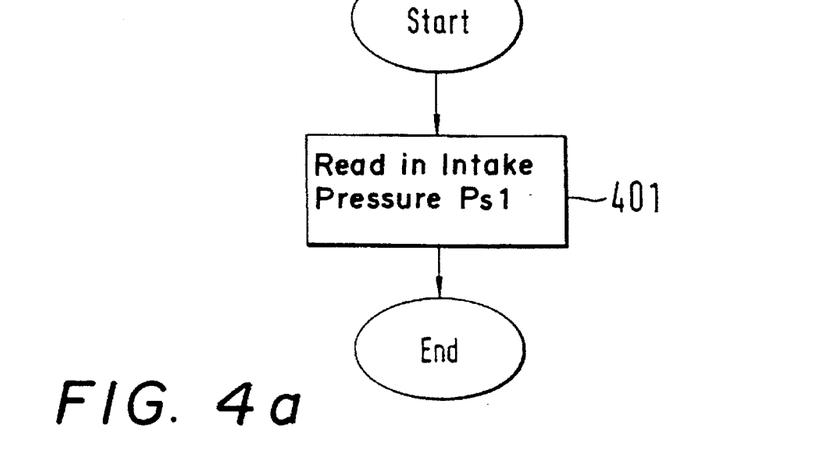
FIGS. 4a and 4b show the program sequence for computing the air charge for a control system wherein intake-pipe pressure is measured.
Figure 4B:
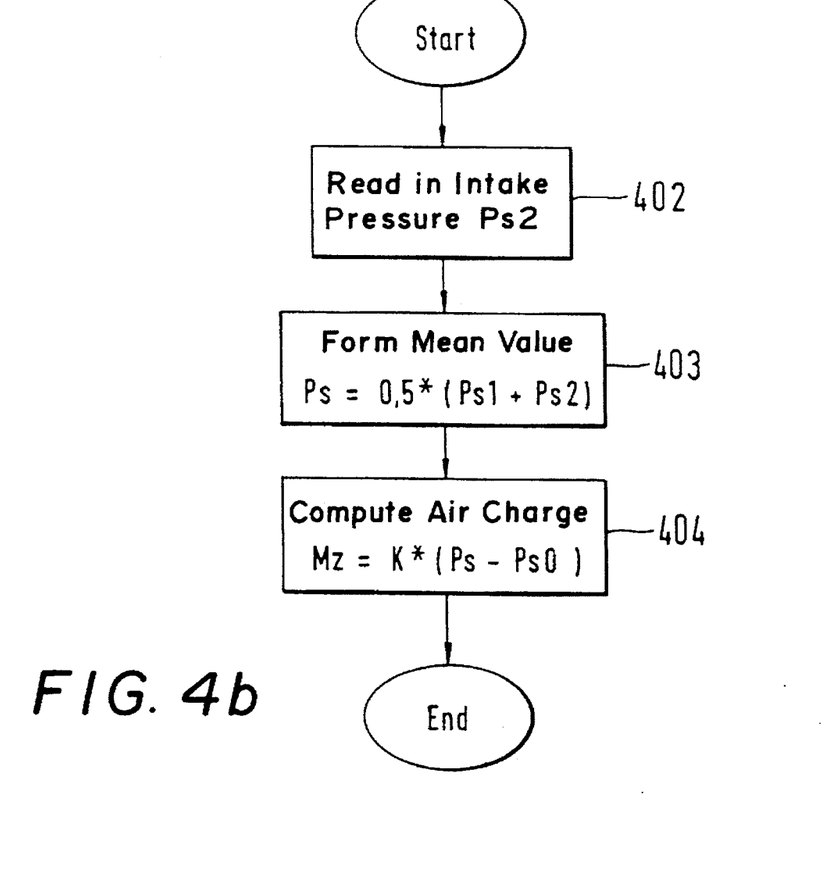

The flowcharts of FIGS. 4a and 4b show the determination of the air pressure in the intake pipe and the subsequent computation of the air charge. The program in FIG. 4a is started once per ignition in a specific crankshaft position, for example, always 180° ahead of ignition top dead center. In step 401, the intake pressure is read in by the pressure sensor 103 and stored in the RAM of the control apparatus in the RAM cell Ps1.

The program in accordance with FIG. 4b is likewise called up once per ignition, however, at a later crankshaft position (such as 90° ahead of ignition top dead center). First, in block 402, the intake-pipe pressure is again read in and stored in the RAM cell Ps2. Thereafter, the mean value of the intake-pipe pressure values read in in steps 401 and 402 is formed (step 403). The typical pulsations of intake-pipe pressure as they are caused by intake operations of the cylinders are suppressed by means of this mean-value formation.

In step 404, the air charge of the cylinder is determined in accordance with equation (9) from the mean value of pressure. For this purpose, the values for the proportionality factor K and the offset Ps0, which were determined in steps 307 and 308, are used.

Figure 5A:
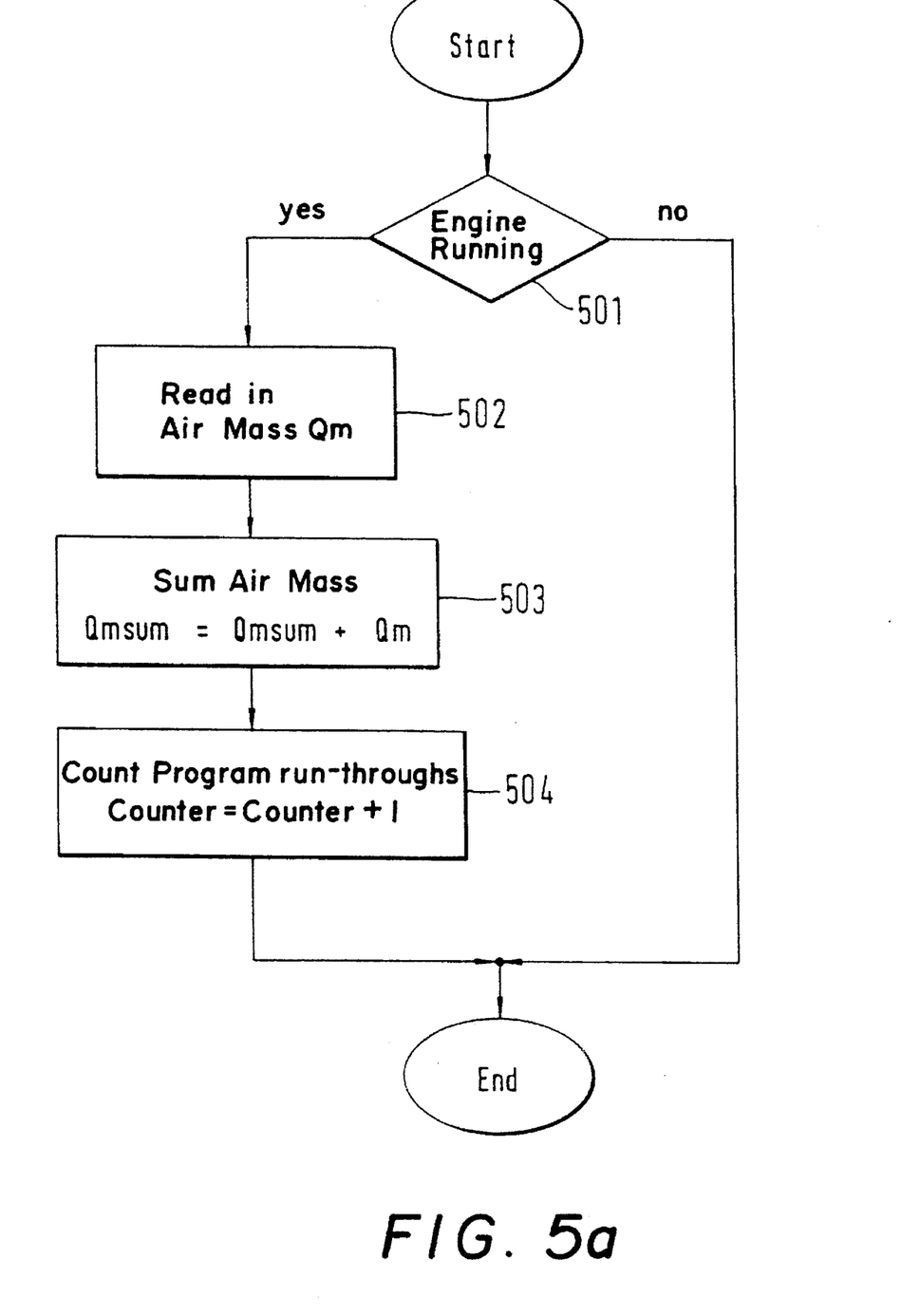
FIG. 5a is a flowchart for determining the signal of an air-mass sensor.
Figure 5B:
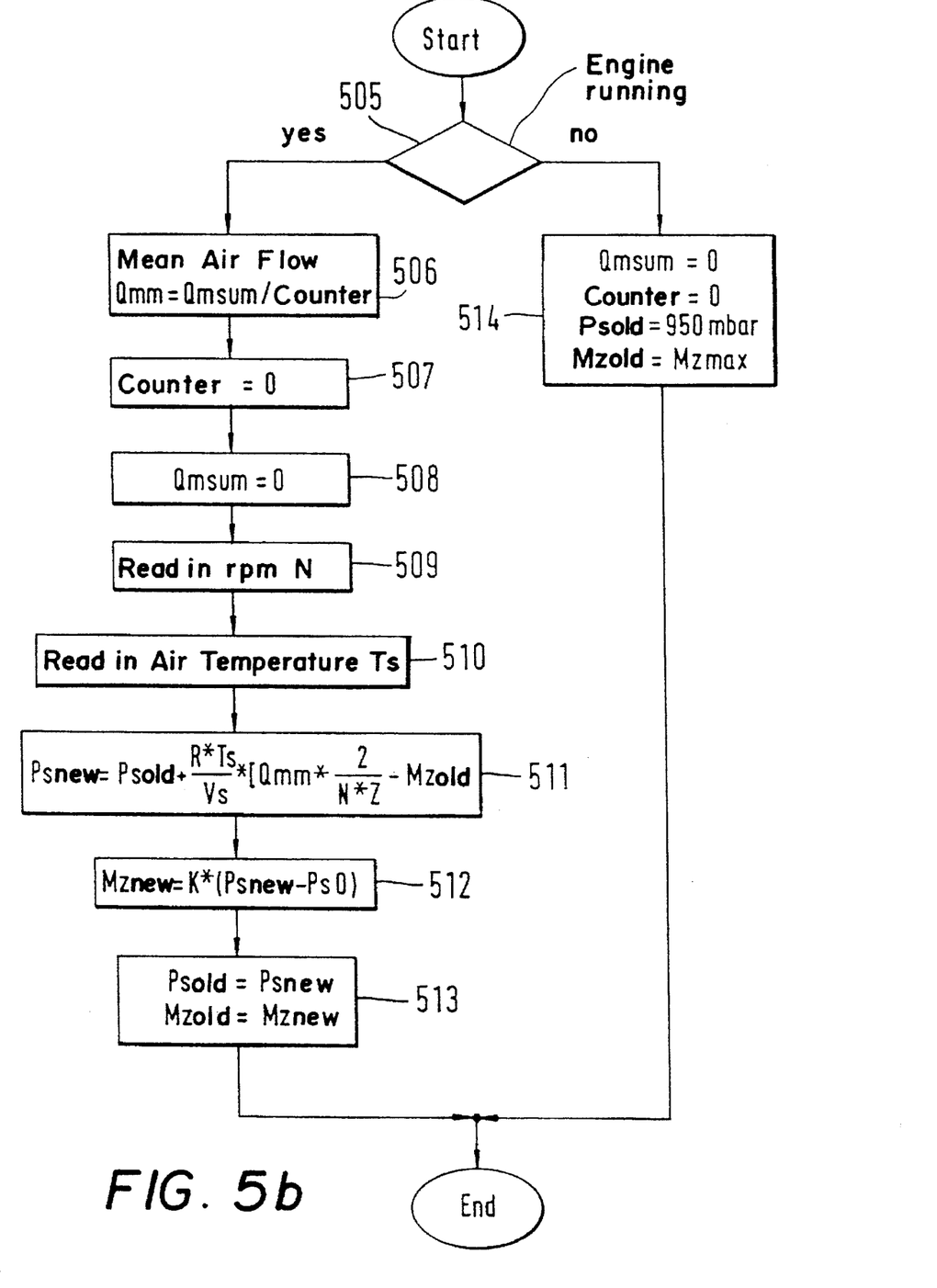
FIG. 5b shows the program sequence for computing the air charge from the measured air-mass flow.

FIGS. 5a and 5b show the procedure for a system which is equipped with an air-mass sensor.

For such a system, the intake-pipe pressure must first be computed from the air mass measured in the intake pipe as it flows in. The air charge of the cylinder is determined from this intake-pipe pressure as, for systems having pressure measurement.

The following balance equation $$dMs = Mdk - Mz \qquad (10)$$

applies for the change dMs of the fresh air mass Ms in the intake pipe during the intake stroke of a cylinder.

Here, Mz is again the fresh air mass inducted by the cylinder and Mdk is the air mass inflowing through the throttle flap in the same time span. The following applies for the equation for ideal gas:

$$PS*VS = MS*R*TS \qquad (11)$$

wherein: Ps is the intake-pipe pressure, Vs is the intake-pipe volume, R is the gas constant for air and Ts is the air temperature in the intake pipe.

The following then applies for the change dPs of the air pressure during the intake stroke:

$$dPs = Ps(k) - Ps(k-1) = dMs * \frac{R*Ts}{Vs} \qquad (12)$$

wherein: Ps(k) and Ps(k−1) are then the values of the intake pressure determined in the two sequential computation steps k−1 and k. The computation is carried out once per intake stroke of a cylinder.

By solving for Ps(k) and inserting the balance equation (10) for the air mass in the intake pipe, the following results:

$$Ps(k) = Ps(k-1) + \frac{R*Ts}{Vs} * (Mdk - Mz) \qquad (13)$$

For the air mass inducted by the cylinder, the relationship (9), which is already known for systems with intake-pipe pressure, can be utilized. The air mass Mdk flows in through the throttle flap and can be computed from the mean value Qmm of the air mass Qm measured by the sensor 114:

$$Mdk = Qmm * dT \qquad (14)$$

wherein, for the time dT between computation steps, the following applies:

$$dT = \frac{2}{N*Z} \qquad (15)$$

wherein: N is the engine rpm and Z is the number of cylinders. This assumes that the computation is carried out once per induction stroke.

In this way, a recurrence equation for the computation of the intake pipe pressure and the air charge can be given as:

$$Ps(k) = Ps(k-1) + \frac{R*Ts}{Vs} * \left( Qmm * \frac{2}{N*Z} - Mz(k-1) \right) \qquad (16)$$

as well as:

$$Mz(k) = K*(Ps(k) - Ps0) \qquad (17)$$

The conversion of the recurrence equations (16) and (17) into a program for computing the air charge is shown in FIGS. 5a and 5b.

The flowchart of FIG. 5a must be run through often (as a rule, in a 1 ms time raster). In this flowchart, a check is first made in block 501 as to whether the engine is running. If the engine is running, then, in step 502, the value of the air-mass flow Qm is read in by the air-mass sensor 114. In steps 503 and 504, the read-in air-mass values Qm as well as the number of program runthroughs are added in order to be able to compute the mean value Qmm of the air-mass flow therefrom in a further program.

The flowchart of FIG. 5b describes a program for determining the intake-pipe pressure and the air charge of the cylinder therefrom. The program is started once per intake stroke, for example, always 90° in advance of ignition top dead center.

In step 505, a check is again made as to whether the engine is running. For a running engine, the mean value Qmm of the air-mass flow is determined in step 506. Thereafter, the program run-through counter and the summation value Qmsum are reset to 0 in steps 507 and 508 so that the program can determine the mean value during the next intake operation in accordance with FIG. 5a.

In blocks 509 and 510, the actual rpm N and the air temperature Ts in the intake pipe are read in from the sensors 104 and 115.

In steps 511 and 512, and starting from intake-pipe pressure Psold and the air charge Mzold from the previous runthrough of the program, the actual values Psnew and Mznew for the intake-pipe pressure and air charge are determined in accordance with the recurrence equations (16) and (17) derived above. For this purpose, the proportionality factor K and the offset Ps0 are needed in step 512. These two quantities must be determined with a program according to FIG. 3b from the valve overlap and the rpm.

In step 513, the actual values of intake-pipe pressure and air charge are stored in the RAM cells Psold and Mzold for the next program runthrough.

When the engine is started, the RAM cells Qmsum, Psold and Mzold as well as the counter for the program runthroughs of the program of FIG. 5a must be set to the appropriate start values. If the determination is made in the inquiry in step 505 that the motor is not running, then the sum value of the air mass Msum as well as the program run-through counter are set to 0 in step 514. As long as the engine is at standstill, the ambient pressure is present in the intake pipe. For this reason, an estimated value for the ambient pressure is set (for example, 950 mbar) as the start value for the intake-pipe pressure Psold. The maximum value Mzmax, which corresponds to the ambient pressure, is used as a corresponding start value for the air charge of the cylinder.

POSSIBLE ALTERNATIVES

The inlet camshaft as well as the outlet camshaft are often not shifted. In this case, it is sufficient for the computation of the valve overlap according to FIGS. 3a and 3b to only detect the position of the variable camshaft with a sensor and, in lieu of the read-in sensor signal of the camshaft which was not shifted, to insert a constant into the computations of FIG. 3b.

Figure 6A:
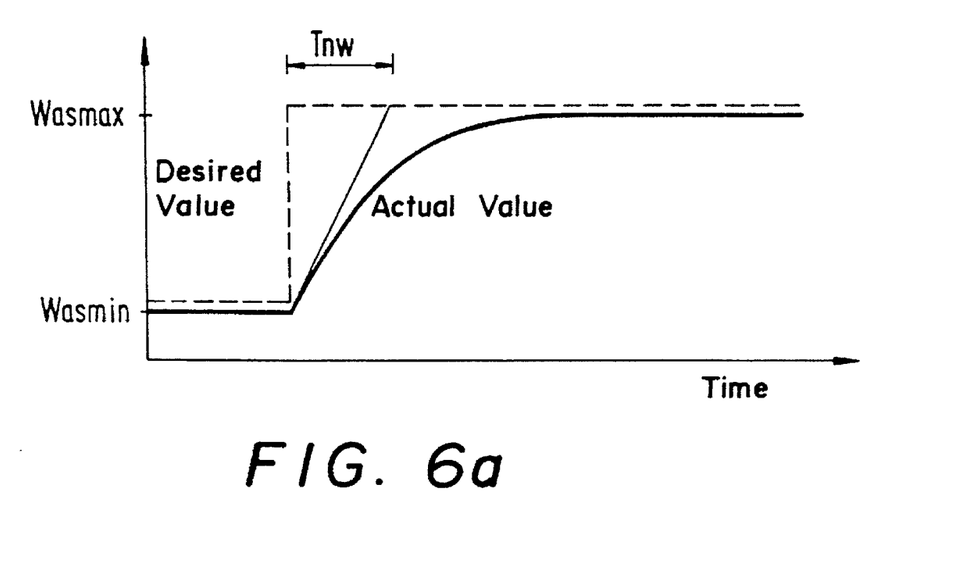
FIG. 6a shows the primary time trace of the camshaft position for a two-position displacement of the camshaft position.

In other cases, the camshafts are not continuously displaced. In lieu thereof, only switchings back and forth between two positions take place. The positions are determined by mechanical stops. For reasons of cost, a sensor for the camshaft position (115 or 115a) is omitted. In this case, the position of the camshaft must be estimated with a model. FIG. 6a shows, as an example, the time trace for the outlet camshaft position when switching over the desired value Wades from Wasmin to Wasmax. The desired value is outputted to the shift system 108a. As an approximation, a low-pass model of the first order is adequate for simulating the trace of the actual value.

Figure 6B:
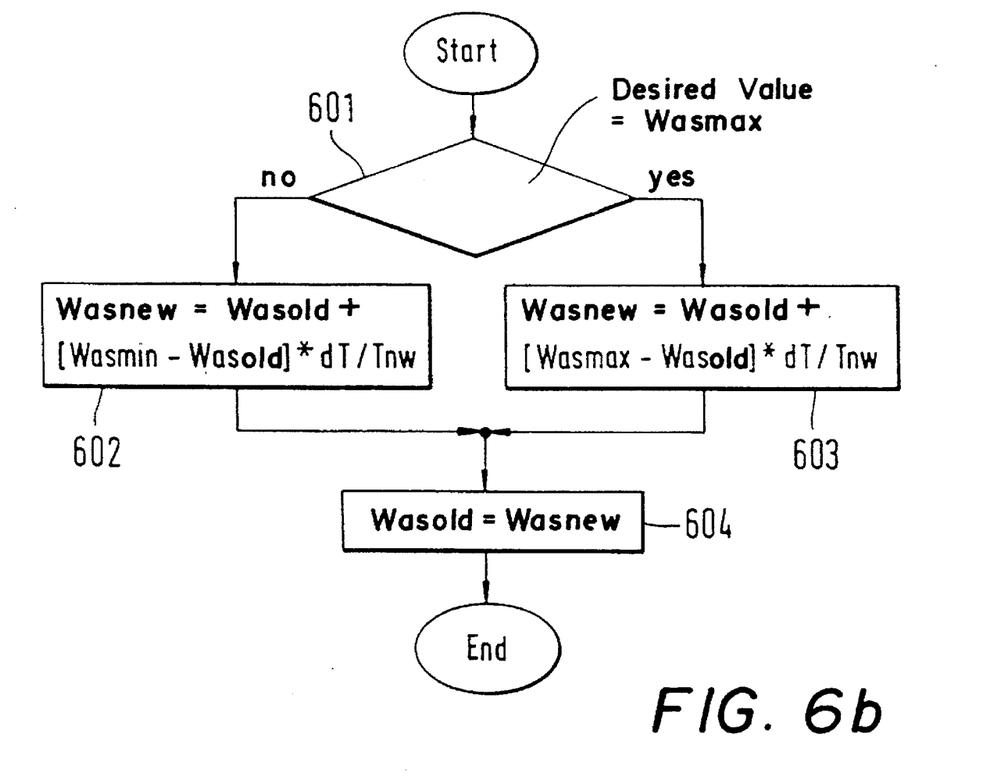
FIG. 6b is a program for determining an estimated value for the camshaft position when the camshaft sensor is omitted.

FIG. 6b shows the corresponding program which, for example, is run through every 10 ms. In step 601, a determination is made as to which of the two possible desired values is to be outputted to the camshaft displacement device 108a. If the lower desired value Wasmin is active, then in step 602, the actual camshaft position Wasnew is computed from the value Wasold determined in the previous runthrough utilizing a digital low-pass filter of the first order:

$$Wasnew = Wasold + (Wasmin - Wasold) * \frac{dT}{Tnw} \quad (18)$$

wherein: dT is the time between the two program runthroughs and Tnw is the time constant of the camshaft change which can be determined from the time trace of FIG. 6a. If in contrast, a determination is made in step 601, that the upper desired value Wasmax is active, then the computation of the camshaft position takes place in accordance with block 603. Here, the upper desired value Wasmax is used in lieu of Wasmin.

In step 604, the actual value of the camshaft position is stored in the memory cell Wasold for the next computation step.

The outlet camshaft position Wasnew determined in this manner can be used in the program in FIG. 3b in lieu of the value read in from sensor 108a.

We claim:

1. In an internal combustion engine equipped with an intake pipe and a control apparatus to control the engine, the engine having a cylinder defining a work volume and which, during engine operation, contains a total gas charge including a mixture charge and residual combusted gas with the mixture charge including a fresh-air portion conducted under pressure in the intake pipe with said fresh-air portion being indicative of the load on said engine, the cylinder including an inlet valve and an outlet valve for facilitating an exchange of said total gas charge and the engine including valve control means for controlling the opening and closing of said valves in dependence upon an operating parameter of said engine, a method for dynamically correctly computing said fresh-air portion wherein the exchange of said total gas charge is influenced in dependence upon said operating parameter the opening phases of said valves being shifted relative to each other thereby defining an overlap variable indicative of the duration that said valves are simultaneously open to said total gas charge, the method comprising the steps of:

determining said pressure of said fresh-air portion in said intake pipe to obtain a value thereof;

measuring said duration to obtain a value thereof; and, computing said fresh-air portion from the values of said pressure and said duration thereby providing an indication of the load on said engine.

2. The method of claim 1, wherein said fresh-air portion passes through said intake pipe as a fresh-air mass flow and the method further comprising the step of computing said intake-pipe pressure from a balance of the fresh-air mass flow flowing into and out of the intake pipe wherein the outflowing fresh-air mass flow which flows out of said intake pipe corresponds to the fresh-air portion of the total charge of the work volume.

3. The method of claim 2, wherein the engine operates at a varying rpm and includes a throttle flap which defines an opening angle and the method further comprising the step of determining the air-mass flow from the opening angle of the throttle flap and the rpm of the engine.

4. The method of claim 3, further comprising the step of measuring said pressure in said intake pipe.

5. The method of claim 1, wherein said valve control means includes two camshafts operating on said inlet and outlet valves, respectively, and said duration corresponds to an angular range of said camshafts and wherein said overlap variable is said angular range over which said inlet valve and said outlet valve are open at the same time.

6. The method of claim 5, wherein, said inlet and outlet valves each defining an opening to said work volume in said duration with one of the openings being smaller than the other; and, wherein the smaller opening during the valve overlap is integrated over the time duration of the valve overlap and is detected.

7. The method of claim 5, wherein, a piston is movable in said cylinder between a top dead center point and a bottom dead center point and, in addition, the position of said angular range is used relative to a reference angle of said crankshafts; and, said reference angle includes the angle corresponding to at least one of said dead center points of the piston of the engine.

8. The method of claim 2, the method further comprising the step of determining said fresh-air mass flow flowing into the intake pipe with an air-mass sensor.

* * * * *

UNITED STATES PATENT AND TRADEMARK OFFICE
CERTIFICATE OF CORRECTION

PATENT NO. : 5,635,634
DATED : June 3, 1997
INVENTOR(S) : Lutz Reuschenbach and Hans Veil It is certified that error appears in the above-identified patent and that said Letters Patent is hereby corrected as shown below:

In column 1, line 39: delete "mMz" and substitute -- Mz -- therefor.

In column 3, after "BRIEF DESCRIPTION OF THE DRAWINGS", insert the paragraph:
-- The invention will now be described with reference to the drawings wherein: --

In column 6, line 7: delete "PS*VS=MS*R*TS" and substitute --Ps*Vs=Ms*R*Ts -- therefor.

In column 8, line 1: delete "dt" and substitute -- dT -- therefor.

Signed and Sealed this

Twenty-seventh Day of October, 1998

Attest:

BRUCE LEHMAN

*Attesting Officer*  *Commissioner of Patents and Trademarks*